United States Patent
Araki et al.

(10) Patent No.: US 10,258,891 B2
(45) Date of Patent: Apr. 16, 2019

(54) STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(71) Applicant: NINTENDO CO., LTD., Kyoto (JP)

(72) Inventors: Hideaki Araki, Kyoto (JP); Ken Kato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 972 days.

(21) Appl. No.: 14/482,172

(22) Filed: Sep. 10, 2014

(65) Prior Publication Data

US 2015/0105150 A1    Apr. 16, 2015

(30) Foreign Application Priority Data

Oct. 11, 2013  (JP) .................................. 2013-213862

(51) Int. Cl.
  *G06F 3/041*    (2006.01)
  *A63F 13/837*   (2014.01)
      (Continued)

(52) U.S. Cl.
  CPC ........ *A63F 13/837* (2014.09); *A63F 13/2145* (2014.09); *A63F 13/22* (2014.09);
      (Continued)

(58) Field of Classification Search
  CPC ........ H04N 13/00; H04N 13/02; G06T 15/00; A63F 9/24; A63F 13/00; A63F 13/06;
      (Continued)

(56) References Cited

U.S. PATENT DOCUMENTS

2007/0160345 A1    7/2007  Sakai et al.
2007/0238500 A1*  10/2007  Hsiung .................. A63F 13/08
                                                      463/1
(Continued)

FOREIGN PATENT DOCUMENTS

JP     2003-195998      7/2003
JP     2011-90532       5/2011
(Continued)

*Primary Examiner* — Chanh D Nguyen
*Assistant Examiner* — Nguyen H Truong
(74) *Attorney, Agent, or Firm* — Nixon & Vanderhye, P.C.

(57) ABSTRACT

An input using a pointing device is acquired, and it is determined whether the input using the pointing device is an operation of moving an input position. If it has been determined in the determination of the operation that the input using the pointing device is the operation of moving the input position, an operation direction of the operation of moving the input position is determined. If the determined operation direction corresponds to any one of a plurality of directions determined in advance, a predetermined display target is moved in a direction based on the operation direction, thereby causing the predetermined display target to appear on a display screen. If it has been determined that the operation direction corresponds to any one of the plurality of directions, a common display target is caused to appear, regardless of which one of the plurality of directions the operation direction corresponds to.

21 Claims, 9 Drawing Sheets

(51) Int. Cl.
   *A63F 13/5378*  (2014.01)
   *A63F 13/26*    (2014.01)
   *A63F 13/42*    (2014.01)
   *A63F 13/2145*  (2014.01)
   *A63F 13/22*    (2014.01)
(52) U.S. Cl.
   CPC .............. *A63F 13/26* (2014.09); *A63F 13/42* (2014.09); *A63F 13/5378* (2014.09)
(58) Field of Classification Search
   CPC . G06F 3/01; G06F 3/033; G06F 3/041; G06F 3/048; G06F 3/0484; G06F 3/0488; G09G 5/00
   See application file for complete search history.

(56) References Cited

U.S. PATENT DOCUMENTS

| | | | | |
|---|---|---|---|---|
| 2009/0094562 | A1* | 4/2009 | Jeong | G06F 3/0486 715/863 |
| 2011/0209097 | A1* | 8/2011 | Hinckley | G06F 3/0483 715/863 |
| 2011/0304607 | A1* | 12/2011 | Ito | G06T 11/60 345/419 |
| 2012/0212450 | A1 | 8/2012 | Takami | |
| 2013/0088450 | A1* | 4/2013 | Takase | G06F 3/0485 345/173 |
| 2013/0104172 | A1* | 4/2013 | Lee | G06F 17/30967 725/60 |
| 2014/0015784 | A1* | 1/2014 | Oonishi | G06F 3/0412 345/173 |
| 2014/0195926 | A1* | 7/2014 | Hussain | G06F 3/0488 715/750 |

FOREIGN PATENT DOCUMENTS

| | | |
|---|---|---|
| JP | 2011-516936 | 5/2011 |
| JP | 2011-238282 | 11/2011 |
| JP | 2012-194765 | 10/2012 |
| WO | WO 2009/097555 | 8/2009 |

* cited by examiner

F I G. 1
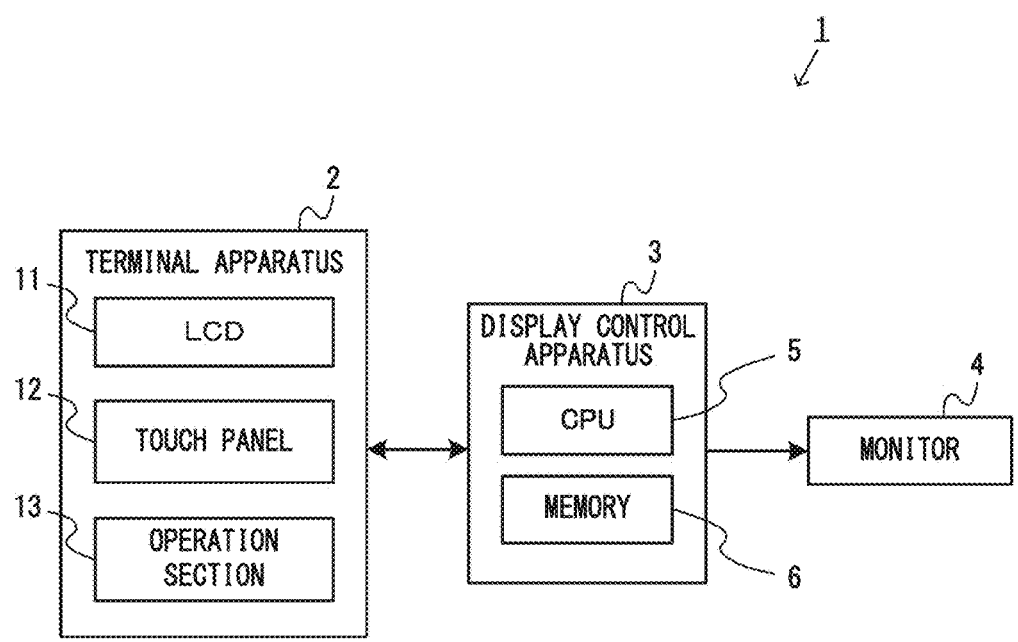

F I G. 5
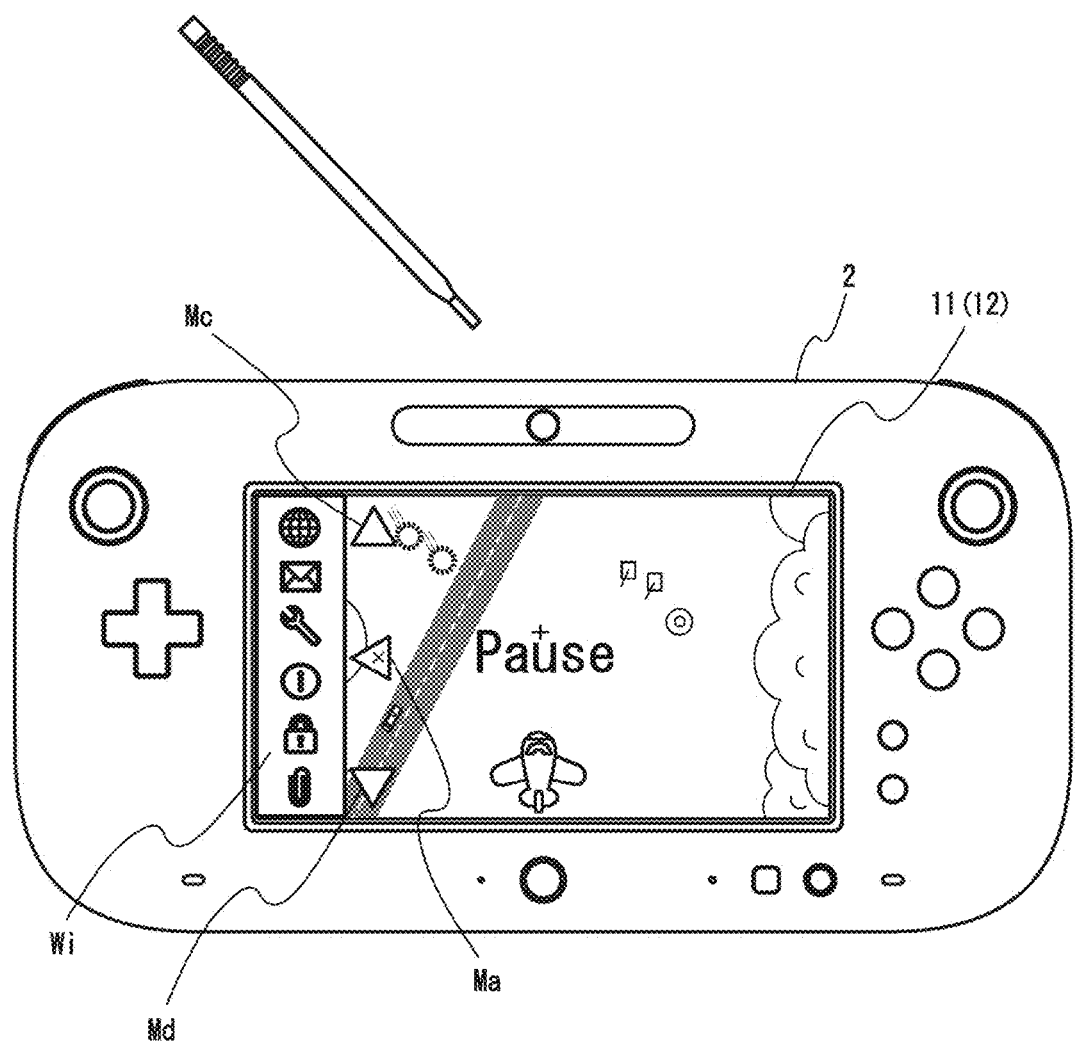

STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

The disclosure of Japanese Patent Application No. 2013-213862, filed on Oct. 11, 2013, is incorporated herein by reference.

FIELD

The technology shown here relates to a storage medium having stored therein a display control program, a display control apparatus, a display control system, and a display control method, and in particular, relates to a storage medium having stored therein a display control program for, for example, displaying an image on a display screen in accordance with a user operation, a display control apparatus, a display control system, and a display control method for, for example, displaying an image on a display screen in accordance with a user operation.

BACKGROUND AND SUMMARY

Conventionally, there is an apparatus for displaying the details of a warning event on a display screen in accordance with a user operation using a touch panel.

In the apparatus, however, the operation of displaying the details of a warning event on the display screen may be inconvenient.

Therefore, it is an object of an exemplary embodiment to provide a storage medium having stored therein a display control program capable of improving the convenience of an operation, a display control apparatus, a display control system, and a display control method capable of improving the convenience of an operation.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein a display control program according to an exemplary embodiment, the display control program is executed by a computer included in an apparatus for, in accordance with an operation using a pointing device for inputting an input position on a display screen, displaying an image on the display screen. The display control program causes the computer to execute: acquiring an input using the pointing device; determining whether or not the input using the pointing device is an operation of moving the input position; if it has been determined in the determination of the operation that the input using the pointing device is the operation of moving the input position, determining an operation direction of the operation of moving the input position; and if the operation direction determined in the determination of the operation direction corresponds to any one of a plurality of directions determined in advance, moving a predetermined display target in a direction based on the operation direction, thereby causing the predetermined display target to appear on the display screen. In the process of causing the display target to appear, if it has been determined that the operation direction corresponds to any one of the plurality of directions, a common display target is caused to appear, regardless of which one of the plurality of directions the operation direction corresponds to.

Based on the above, it is possible to cause a common display target to appear on a display screen by a pointing device operation not in one direction determined in advance but in an operation direction corresponding to any one of a plurality of directions determined in advance. This makes it possible to cause the common display target to appear on the display screen by a very convenient operation.

In addition, the display control program may further cause the computer to execute, if an operation in the operation direction corresponding to any one of the plurality of directions has been performed with the display target displayed on the display screen, displaying the display target on the display screen while moving the display target in accordance with the operation direction.

Based on the above, it is also possible to perform the operation of moving a display target having appeared by a very convenient operation.

In addition, the display control program may further cause the computer to execute, if a predetermined operation different from an operation capable of causing the display target to appear has been performed with the display target displayed on the display screen, erasing the display target from the display screen.

Based on the above, it is possible to erase a display target without confusion with the operation of moving the display target.

In addition, the predetermined operation may be an operation of selecting, using the pointing device, a predetermined display area displayed on the display screen.

Based on the above, it is possible to easily erase a display target without confusion with the operation of moving the display target.

In addition, in the process of causing the display target to appear, if the operation direction of the operation of causing the display target to appear has been upward or downward on the display screen, a display target capable of moving to the left or right on the display screen in accordance with an operation using the pointing device may be caused to appear, and if the operation direction of the operation of causing the display target to appear has been to the left or right on the display screen, a display target capable of moving upward or downward on the display screen in accordance with an operation using the pointing device may be caused to appear.

Based on the above, it is possible to easily move a display target by performing an operation in a direction different from the operation of causing the display target to appear.

In addition, the display control program may further cause the computer to execute, if the operation direction of the operation of causing the display target to appear has been upward or downward on the display screen and after the display target has been displayed on the display screen, erasing the display target from the display screen in accordance with an operation of which an operation direction is upward or downward on the display screen, and if the operation direction of the operation of causing the display target to appear has been to the left or right on the display screen and after the display target has been displayed on the display screen, erasing the display target from the display screen in accordance with an operation of which an operation direction is to the left or right on the display screen.

Based on the above, it is possible to easily erase a display target by performing an operation in the same direction as or a direction opposite to that of the operation of causing the display target to appear.

In addition, the plurality of directions determined in advance may be two or more of up, down, left, and right directions on the display screen.

Based on the above, it is possible to cause a display target to appear by a convenient operation for performing an operation not in one direction determined in advance but in any two of up, down, left, and right directions.

In addition, in the process of causing the display target to appear, the display target may be displayed on top of at least part of a display image that has been displayed on the display screen before the display target has been caused to appear.

Based on the above, it is possible to cause a display target to appear in priority to a display image that has been displayed on a display screen.

In addition, in the process of causing the display target to appear, the display target may be displayed on top of an entirety of a display image that has been displayed on the display screen before the display target has been caused to appear.

Based on the above, it is possible to display a display target using a relatively large display area.

In addition, the display target may be an information image that describes information regarding a display image that has been displayed on the display screen before the display target has been caused to appear, or information regarding the apparatus.

Based on the above, it is possible to cause information likely to be desired by a user to appear by a convenient operation.

In addition, the display control program may further cause the computer to execute displaying on each of a plurality of display screens a display image based on execution of a predetermined application. In this case, in the process of causing the display target to appear, a display target different from the display image may be caused to appear on one of the plurality of display screens.

Based on the above, it is possible to, with a display target displayed on one display screen, view a display image based on the execution of an application using another display screen.

In another exemplary configuration of a non-transitory computer-readable storage medium having stored therein a display control program according to the exemplary embodiment, the display control program is executed by a computer included in an apparatus for, in accordance with an operation using a pointing device for inputting an input position on a display screen, displaying an image on the display screen. The display control program causes the computer to execute: acquiring an input using the pointing device; determining an operation direction of an operation of moving the input position using the pointing device; and if the operation direction determined in the determination of the operation direction corresponds to at least either a first direction or a second direction determined in advance, moving a predetermined display target in a direction corresponding to the operation direction, thereby causing the predetermined display target to appear on the display screen, wherein in the process of causing the display target to appear, a common display target is caused to appear when the operation direction has been determined as corresponding to the first direction and when the operation direction has been determined as corresponding to the second direction.

Based on the above, it is possible to cause a common display target to appear on a display screen by a pointing device operation not in one direction determined in advance but in an operation direction corresponding to at least either a first direction or a second direction determined in advance. This makes it possible to cause the common display target to appear on the display screen by a very convenient operation.

In addition, the exemplary embodiment may be carried out in the forms of a display control apparatus and a display control system including a computer for achieving the above operations, and a display control method including the above operations.

According to the exemplary embodiment, it is possible to cause a common display target to appear on a display screen by a pointing device operation not in one direction determined in advance but in an operation direction corresponding to any one of a plurality of directions determined in advance. This makes it possible to cause the display target to appear on the display screen by a very convenient operation.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a block diagram showing a non-limiting example of a display control system 1;

FIG. 5 is a diagram showing a non-limiting example of a second example of the state of where the display target (an operation icon image group) has appeared on the terminal apparatus 2;

DETAILED DESCRIPTION OF NON-LIMITING EXAMPLE EMBODIMENTS

Figure 2:
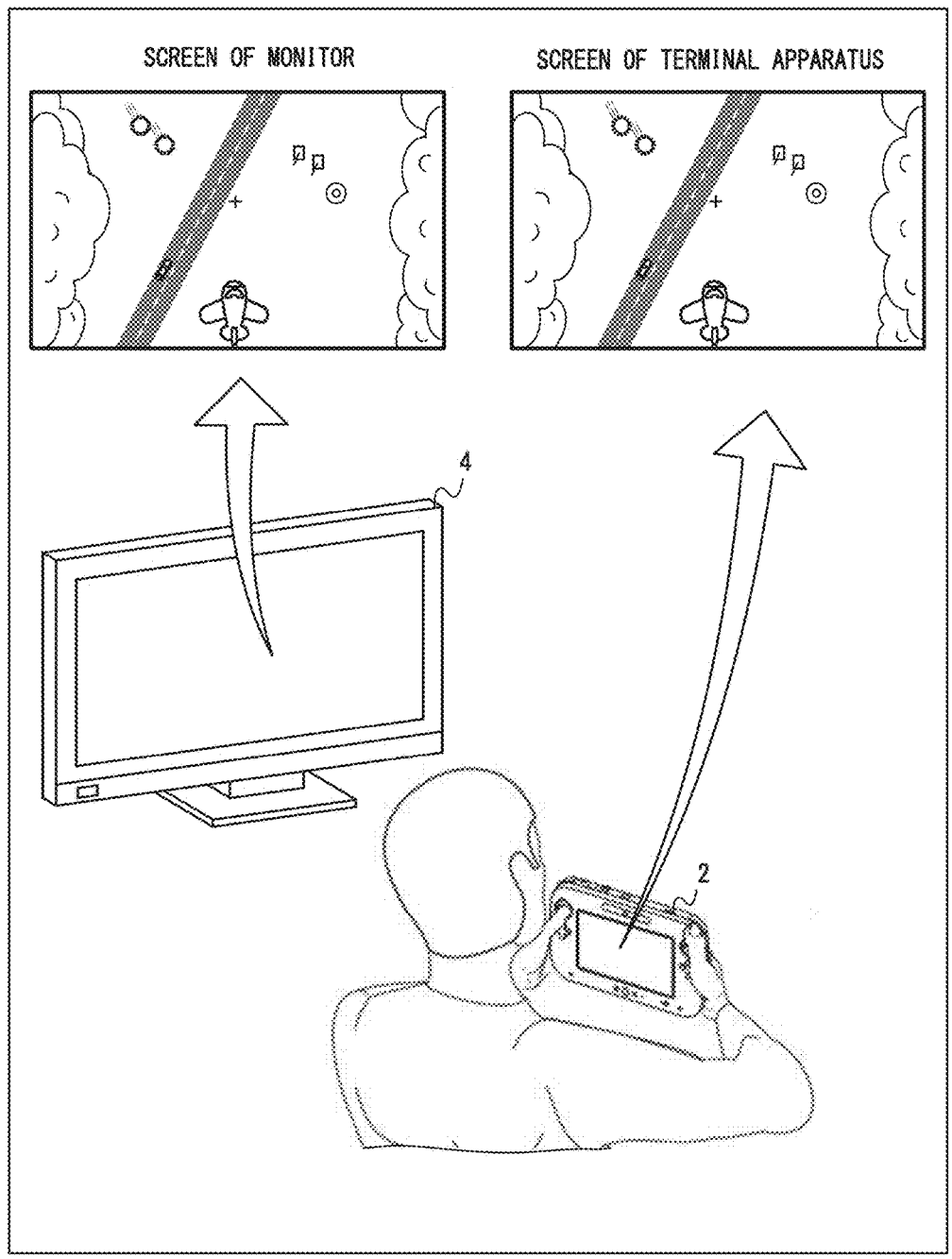
FIG. 2 is a diagram showing non-limiting examples of image (game images) displayed in the display control system 1.

With reference to FIG. 1, a description is given of a display control apparatus for executing a display control program and a display control system including the display control apparatus, according to an exemplary embodiment. It should be noted that FIG. 1 is a block diagram showing an example of a display control system 1 including a display control apparatus 3. As an example, the display control apparatus 3 is composed of a stationary game apparatus, and the display control system 1 is composed of a game system including the stationary game apparatus.

In FIG. 1, the display control system 1 includes a terminal apparatus 2, the display control apparatus 3, and a monitor 4. The display control system 1 according to the exemplary embodiment generates images (for example, game images) and displays the images on display apparatuses (the terminal apparatus 2 and the monitor 4).

In the display control system 1, the display control apparatus 3 executes information processing and a display control process in accordance with an input to the terminal apparatus 2, and the images obtained as a result of the execution of the information processing and the display control process are displayed on the terminal apparatus 2 and/or the monitor 4. As described above, in the exemplary embodiment, the display control system 1 is configured to achieve an input function, an information processing function, and a display function by a plurality of apparatuses. It should be noted that in another exemplary embodiment, the configuration of the display control system 1 may be such that the monitor 4 is connected, using wired or wireless communication, to a single display control apparatus (for example, a portable display control apparatus) having these functions.

The terminal apparatus 2 is an input apparatus that can be held by a user (a portable input apparatus). The terminal apparatus 2 is capable of communicating with the display control apparatus 3. The terminal apparatus 2 transmits operation data representing the operation on the terminal apparatus 2 to the display control apparatus 3. Further, in the exemplary embodiment, the terminal apparatus 2 includes a display section (an LCD 11), and therefore, the terminal apparatus 2 serves also as a display apparatus. When an image has been transmitted from the display control apparatus 3, the terminal apparatus 2 displays the image on the LCD 11.

In addition, the terminal apparatus 2 includes a touch panel 12 and an operation section 13 as an input section. For example, the touch panel 12 detects the position of an input provided to a predetermined input surface (for example, a display screen of the LCD 11) provided in a housing of the terminal apparatus 2. Further, as an example, the operation section 13 includes an analog stick, a directional pad, an operation button, and the like.

The display control apparatus 3 performs various types of information processing performed in the display control system 1, such as the process of generating an image. In the exemplary embodiment, the display control apparatus 3 has a CPU (control section) 5 and a memory 6. The CPU 5 executes a predetermined information processing program (for example, a display control program) using the memory 6, thereby achieving various functions of the display control apparatus 3. It should be noted that the display control apparatus 3 may have any configuration so long as it can perform the display control process described above. In the exemplary embodiment, the display control apparatus 3 generates images (for example, game images and other images) and outputs the generated images to the terminal apparatus 2 and/or the monitor 4, which serve as display apparatuses.

The monitor 4 is an example of a display apparatus that displays a generated image. The monitor 4 is capable of receiving data transmitted from the display control apparatus 3. When an image generated by the display control apparatus 3 has been transmitted to the monitor 4, the monitor 4 displays the image.

Figure 3:
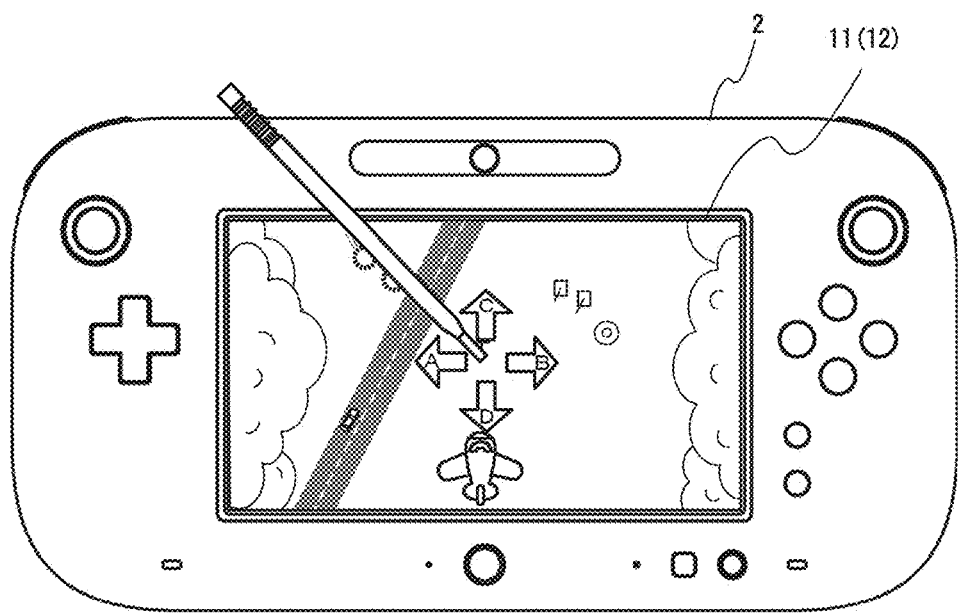
FIG. 3 is a diagram showing a non-limiting example where the operation is performed of, with a game image displayed on a terminal apparatus 2, causing a display target different from the game image to appear.
Figure 4:
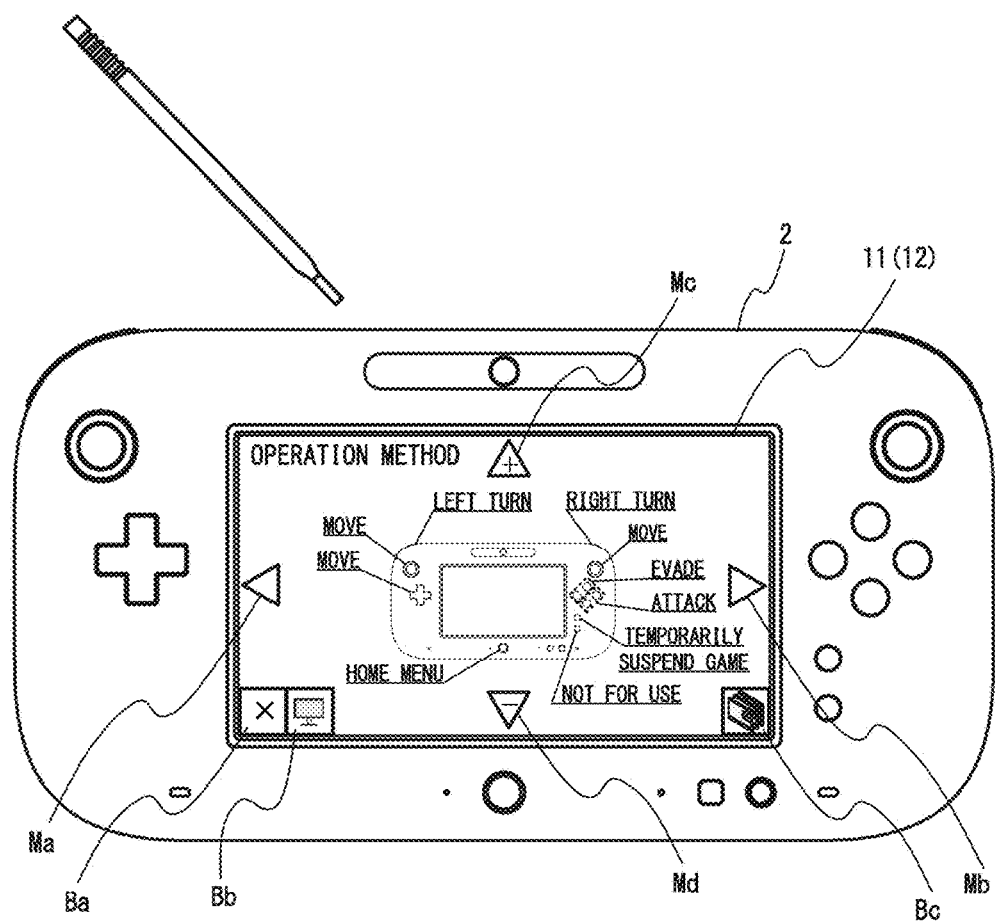
FIG. 4 is a diagram showing a non-limiting example of a first example of the state where a display target (an information image) has appeared on the terminal apparatus 2.
Figure 6:
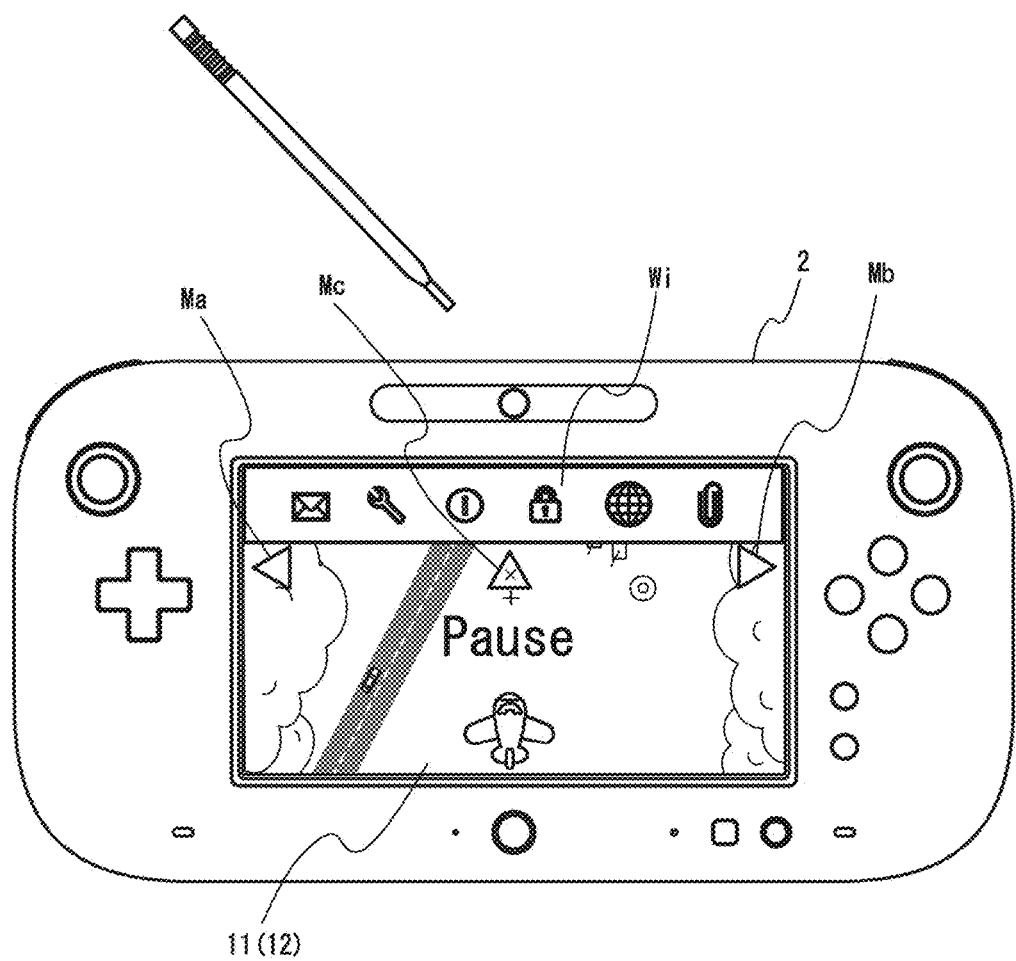
FIG. 6 is a diagram showing a non-limiting example of a third example of the state where the display target (an operation icon image group) has appeared on the terminal apparatus 2.

Next, with reference to FIGS. 2 through 6, a description is given of an overview of the display control process performed by the display control apparatus 3, before the description of specific processing performed by the display control apparatus 3. FIG. 2 is a diagram showing examples of images (game images) displayed in the display control system 1. FIG. 3 is a diagram showing an example where the operation is performed of, with a game image displayed on the terminal apparatus 2, causing a display target different from the game image to appear. FIG. 4 is a diagram showing a first example of the state where a display target (an information image) has appeared on the terminal apparatus 2. FIG. 5 is a diagram showing a second example of the state where the display target (an operation icon image group) has appeared on the terminal apparatus 2. FIG. 6 is a diagram showing a third example of the state where the display target (an operation icon image group) has appeared on the terminal apparatus 2.

As shown in FIG. 2, in the exemplary embodiment, as an example, if the user plays a game while holding the terminal apparatus 2 as an input apparatus, a game image is displayed on each of the terminal apparatus 2 and the monitor 4. For example, the user performs a touch operation on the touch panel 12 and operates the operation section 13 while viewing the display screen (the LCD 11) of the terminal apparatus 2. This enables the user to operate an object placed in a virtual world displayed on each of the terminal apparatus 2 and the monitor 4. It should be noted that in the example shown in FIG. 2, the same game image is displayed on each of the terminal apparatus 2 and the monitor 4.

In the exemplary embodiment, the user performs a particular operation during the above game play and thereby can temporarily stop the game and cause a display target different from a displayed game image to appear on the LCD 11. For example, the particular operation is an operation not used in the game play, and the user performs the operation of moving a touch position on the touch panel 12 (a so-called slide operation, swipe operation, or the like) as shown in FIG. 3. This enables the user to cause the display target to appear on the LCD 11. It should be noted that the operation of moving the touch position may be performed such that the starting point of the movement operation is an end portion of the display screen or is not an end portion of the display screen. In the exemplary embodiment, the user performs the operation of moving the touch position in any direction and thereby can cause the display target to appear. Specifically, the display target appears on the LCD 11 by any of the operation of moving the touch position on the touch panel 12 to the left (a slide operation or a swipe operation in a direction A shown in FIG. 3), the operation of moving the touch position on the touch panel 12 to the right (a slide operation or a swipe operation in a direction B shown in FIG. 3), the operation of moving the touch position on the touch panel 12 upward (a slide operation or a swipe operation in a direction C shown in FIG. 3), and the operation of moving the touch position on the touch panel 12 downward (a slide operation or a swipe operation in a direction D shown in FIG. 3). It should be noted that for ease of description, in the example of FIG. 3, outline arrows indicating the directions of moving the touch position on the touch panel 12. These arrows, however, may not be displayed on the LCD 11.

FIG. 4 shows the first example, where an information image appears as the display target on the LCD 11. For example, the information image is an image representing information related to a game that has been played by displaying a game image on the LCD 11 before performing the operation of causing another display target to appear, information regarding a game system that is being used by the user (for example, the manual of the apparatus), or the like. The example shown in FIG. 4 shows the state where a part of the manual of the game (a page of the operation method for playing the game) has appeared as an information image on the LCD 11. In this case, the user performs the operation of causing another display target to appear during the game and thereby can read the manual of the game, such as the operation method and the description of the content regarding the game, and the like.

Here, when appearing on the LCD 11, the information image appears at a position overlapping the game image that has been displayed before the appearance of the information image, by moving (for example, sliding in) toward the center of the display screen from outside the display screen. The movement method of the appearance of the information image has a direction based on the operation direction of the operation performed to cause the information image to appear. For example, if the operation has been performed of moving the touch position on the touch panel 12 to the left (an operation in the direction A shown in FIG. 3) to cause the information image to appear, the information image appears from the right end of the LCD 11 and moves to the left in the display screen, thereby moving to and stopping at an initial display position (a display position shown in FIG. 4). Further, if the operation has been performed of moving the touch position on the touch panel 12 upward (an operation in the direction C shown in FIG. 3) to cause the information image to appear, the information image appears from the lower end of the LCD 11 and moves upward in the display screen, thereby moving to and stopping at the initial display position. That is, the operation direction of the operation performed to cause the information image to appear and the moving direction of the appearance of the information image are the same.

It should be noted that the operation direction and the moving direction may not be exactly the same. For example, the moving direction of the appearance of the information image may be set to four directions at 90-degree intervals or the like or eight directions at 45-degree intervals or the like, so that the direction closest to the operation direction is selected from the set directions, and the information image is caused to move and appear.

The information image is displayed on top of the game image that has been displayed before the appearance of the information image. If the information image has moved to the initial display position, the information image is displayed on the entire display screen. Thus, if the information image is not a see-through image, the game image that has been displayed before the appearance of the information image cannot be viewed at all. If the information image is a see-through image, the information image and the game image that has been displayed before the appearance of the information image can be viewed in a superimposed manner. Then, if the information image has been displayed on the LCD 11, various operation mark images and operation button images for performing the operation of reading the information image and for closing the information image to resume the game are displayed.

For example, in the example of FIG. 4, four operation mark images Ma to Md and three operation button images Ba to Bc are displayed on the LCD 11. Each of the operation mark images Ma to Md is a sign for guiding the operation direction of the operation of moving the touch position on the touch panel 12 (a so-called slide operation, swipe operation, or the like). For example, the operation mark image Ma is a guide indicating that if the operation has been performed of moving the touch position on the touch panel 12 to the left, the information image moves to the left (for example, page turning for causing the page to the right of the displayed information image to appear, or left scroll for moving the displayed information image to the left). The operation mark image Mb is a guide indicating that if the operation has been performed of moving the touch position on the touch panel 12 to the right, the information image moves to the right (for example, page turning for causing the page to the left of the displayed information image to appear, or right scroll for moving the displayed information image to the right). The operation mark image Mc is a guide indicating that if the operation has been performed of moving the touch position on the touch panel 12 upward, the information image is displayed in an enlarged manner. Then, the operation mark image Md is a guide indicating that if the operation has been performed of moving the touch position on the touch panel 12 downward, the information image is displayed in a reduced manner. It should be noted that the operation of selecting any one of the four operation mark images Ma to Md (for example, the operation of touching a position overlapping any one of the operation mark images Ma to Md) may be performed, thereby performing the operation guided by the selected one of the operation mark images Ma to Md (for example, page turning, scroll, enlargement, or reduction).

The operation button images Ba to Bc are configured such that if a touch operation (for example, a single-press operation or a click operation) has been performed on the touch panel 12 provided on each button image, the operation indicated by the button image is performed. For example, if a touch operation has been performed on the operation button image Ba, the information image displayed on the LCD 11 is erased, and the game that has been temporarily stopped to display the information image is resumed. That is, an operation different from the operation for displaying the information image is performed, thereby enabling the erasing of the information image. If a touch operation has been performed on the operation button image Bb, the game that has been temporarily stopped is resumed using the display screen of the monitor 4 with the information image remaining displayed on the LCD 11. If a touch operation has been performed on the operation button image Bc, a list of all the pages (all the display areas) of the displayed information image is displayed on the LCD 11 with all the pages of the displayed information image reduced.

As described above, in the first example, where the information image appears on the LCD 11, the operation is performed of moving the touch position on the touch panel 12, whereby it is possible to move the information image in a scrolling manner in accordance with the moving direction or display the information image in an enlarged or reduced manner. Here, in the first example, where the information image appears on the LCD 11, the operation for causing the information image to appear and the operation for moving the information image in a scrolling manner or displaying the information image in an enlarged or reduced manner after the information image has been displayed are achieved by the same operation (that is, the operation of moving the touch position on the touch panel 12). Thus, the user only performs the operation of moving the touch position on the touch panel 12 and thereby can control the display of the information image. This enables a very convenient operation.

It should be noted that the information image may appear if the direction of moving the touch position on the touch panel 12 corresponds to at least two directions determined in advance, so long as the operation is not used in the game play. As an example, the information image may appear in accordance only with the operation of moving the touch position on the touch panel 12 in the horizontal direction (to the left or right), or only with the operation of moving the touch position on the touch panel 12 in the vertical direction (upward or downward). For example, if the display target appears in accordance only with the operation of moving the touch position on the touch panel 12 in the horizontal direction, it is possible to cause the same display target to appear by either the operation of moving the touch position on the touch panel 12 to the left or the operation of moving the touch position on the touch panel 12 to the right. This can provide an operation environment that is easy for both a right-handed user and a left-handed user to use.

FIG. 5 shows the second example, where an operation icon image group Wi appears as the display target on the LCD 11. For example, the operation icon image group Wi is configured such that if a touch operation (for example, a single-press operation or a click operation) has been performed on the touch panel 12 provided on each operation icon image, the operation indicated by the operation icon image is performed. For example, if the user has performed a touch operation on one of the operation icon images included in the operation icon image group Wi displayed on the LCD 11, this enables the operation of displaying an email received from another apparatus or an email transmitted to another apparatus, or the operation of setting an apparatus such as the terminal apparatus 2 or the display control apparatus 3. Here, the operation enabled by touching any one of the operation icon images included in the operation icon image group Wi may be an operation related to the game that has been played before the appearance of the operation icon image group Wi, or may be an operation not related to the game. Further, a status bar, a menu bar, or the like may be caused to appear as the display target on the LCD 11 so as to be included in the operation icon image group Wi, or in addition to (or instead of) the operation icon image group Wi.

Here, when appearing on the LCD 11, the operation icon image group Wi appears in a peripheral area of the display screen at the position overlapping the game image that has been displayed before the appearance of the operation icon image group Wi. The appearance position and the initial display position of the appearance of the operation icon image group Wi are in a direction based on the operation direction of the operation performed to cause the operation icon image group Wi to appear. For example, the second example shown in FIG. 5, where the operation icon image group Wi appears on the LCD 11, shows the case where the operation of causing the display target to appear has been performed by the operation of moving the touch position on the touch panel 12 to the right (a slide operation or a swipe operation in the direction B shown in FIG. 3). In this case, the operation icon image group Wi is displayed such that the operation icon images are arranged in the vertical direction. The operation icon image group Wi appears from the left end of the LCD 11, moves to the right, and stops such that a peripheral area along the left side of the display screen is the initial display position. That is, the operation direction of the operation performed to cause the operation icon image group Wi to appear and the moving direction of the appearance of the operation icon image group Wi are the same.

The operation icon image group Wi is displayed on top of a part of a peripheral area of the game image that has been displayed before the appearance of the operation icon image group Wi. Thus, if the operation icon image group Wi is not a see-through image, the part of the peripheral area of the game image that has been displayed before the appearance of the operation icon image group Wi cannot be viewed at all. If the operation icon image group Wi is a see-through image, the operation icon image group Wi and the part of the peripheral area of the game image that has been displayed before the appearance of the operation icon image group Wi can be viewed in a superimposed manner. If the operation icon image group Wi has been displayed on the LCD 11, various operation mark images for performing the operation of reading the operation icon image group Wi and for closing the operation icon image group Wi to resume the game are displayed. It should be noted that if the operation icon image group Wi is not a see-through image, the game image that has been displayed before the appearance of the operation icon image group Wi may be displayed such that the entire game image is displayed in a reduced manner on the LCD 11 or is moved so as to correspond to the display of the appearance of the operation icon image group Wi, so that the game image does not overlap the operation icon image group Wi.

For example, in the example of FIG. 5, three operation mark images Ma, Mc, and Md are displayed on the LCD 11. Similarly to the example shown in FIG. 4, each of the operation mark images Ma, Mc, and Md is a sign for guiding the operation direction of the operation of moving the touch position on the touch panel 12 (a so-called slide operation, swipe operation, or the like). For example, the operation mark image Ma is a guide indicating that if the operation has been performed of moving the touch position on the touch panel 12 to the left, the operation icon image group Wi displayed on the LCD 11 is withdrawn (for example, slid out) to the left and erased, and the game that has been temporarily stopped to display the operation icon image group Wi is resumed. It should be noted that the operation of withdrawing and erasing the operation icon image group Wi may be the operation of moving the touch position on the touch panel 12 to the right. In this case, the operation icon image group Wi displayed on the LCD 11 may move to the right, thereby being withdrawn from within the display screen and erased. That is, the configuration may be such that if the operation direction of the operation of causing the display target to appear has been either of the left and right directions, an operation in a direction opposite to the operation direction of the operation of causing the operation icon image group Wi to appear enables the erasing of the display target. Alternatively, the configuration may be such that an operation in either of the left and right directions enables the erasing of the display target.

In addition, the operation mark image Mc is a guide indicating that if the operation has been performed of moving the touch position on the touch panel 12 upward, the entire operation icon image group Wi moves upward (moves upward in a scrolling manner). In this case, a part of the operation icon image group Wi moves upward to the position of going out of the display area of the LCD 11 and becomes hidden, while the operation icon images that have not been displayed among the operation icon image group Wi appear from a lower portion of the LCD 11. Further, the operation mark image Md is a guide indicating that if the operation has been performed of moving the touch position on the touch panel 12 downward, the entire operation icon image group Wi moves downward (moves downward in a scrolling manner). In this case, a part of the operation icon image group Wi moves downward to the position of going out of the display area of the LCD 11 and becomes hidden, while the operation icon images that have not been displayed among the operation icon image group Wi appear from an upper portion of the LCD 11. It should be noted that the operation of selecting any one of the three operation mark images Ma, Mc, and Md (for example, the operation of touching a position overlapping any one of the operation mark images Ma, Mc, and Md) may be performed, thereby performing the operation guided by the selected one of the operation mark images Ma, Mc, and Md.

FIG. 6 shows the third example, where an operation icon image group Wi appears as the display target on the LCD 11. As the operation icon image group Wi in the third example, operation icon images are displayed that are different in display form from, but are substantially the same (common) as, the operation icon image group Wi in the second example. The third example shows the case where the operation of causing the display target to appear has been performed by the operation of moving the touch position on the touch panel 12 downward (a slide operation or a swipe operation in the direction D shown in FIG. 3). In this case, the operation icon image group Wi is displayed such that the operation icon images are arranged in the horizontal direction. The operation icon image group Wi appears from the upper end of the LCD 11, moves downward, and stops such that a peripheral area along the upper side of the display screen is the initial display position. That is, also in this case, the operation direction of the operation performed to cause the operation icon image group Wi to appear and the moving direction of the appearance of the operation icon image group Wi are the same. Then, if the operation icon image group Wi has been displayed on the LCD 11, various operation mark images for performing the operation of reading the operation icon image group Wi and for closing the operation icon image group Wi to resume the game are displayed.

For example, in the example of FIG. 6, three operation mark images Ma to Mc are displayed on the LCD 11. Similarly to the examples shown in FIGS. 4 and 5, each of the operation mark images Ma to Mc is a sign for guiding the operation direction of the operation of moving the touch position on the touch panel 12 (a so-called slide operation, swipe operation, or the like). For example, the operation mark image Ma is a guide indicating that if the operation has been performed of moving the touch position on the touch panel 12 to the left, the entire operation icon image group Wi moves to the left (moves to the left in a scrolling manner). In this case, a part of the operation icon image group Wi moves to the left to the position of going out of the display area of the LCD 11 and becomes hidden, and the operation icon images that have not been displayed among the operation icon image group Wi appear from the right of the LCD 11. Further, the operation mark image Mb is a guide indicating that if the operation has been performed of moving the touch position on the touch panel 12 to the right, the entire operation icon image group Wi moves to the right (moves to the right in a scrolling manner). In this case, a part of the operation icon image group Wi moves to the right to the position of going out of the display area of the LCD 11 and becomes hidden, and the operation icon images that have not been displayed among the operation icon image group Wi appear from the left of the LCD 11.

Then, the operation mark image Mc is a guide indicating that if the operation has been performed of moving the touch position on the touch panel 12 upward, the operation icon image group Wi displayed on the LCD 11 is withdrawn upward and erased, and the game that has been temporarily stopped to display the operation icon image group Wi is resumed. It should be noted that the operation of withdrawing and erasing the operation icon image group Wi may be the operation of moving the touch position on the touch panel 12 downward. In this case, the operation icon image group Wi displayed on the LCD 11 may move downward, thereby being withdrawn from within the display screen and erased. That is, the configuration may be such that if the operation direction of the operation of causing the display target to appear has been either of the up and down directions, an operation in a direction opposite to the operation direction of causing the display target to appear enables the erasing of the display target. Alternatively, the configuration may be such that an operation in either of the up and down directions enables the erasing of the display target. It should be noted that the operation of selecting any one of the three operation mark images Ma to Mc (for example, the operation of touching a position overlapping any one of the operation mark images Ma to Mc) may be performed, thereby performing the operation guided by the selected one of the operation mark images Ma to Mc.

It should be noted that the second and third examples described above have used an example where the operation icon image group Wi appears from the left end or the upper end of the display screen of the LCD 11. Alternatively, the operation icon image group Wi may be caused to appear from the right end or the lower end of the display screen. For example, if the operation of causing the display target to appear has been performed by the operation of moving the touch position on the touch panel 12 to the left (a slide operation or a swipe operation in the direction A shown in FIG. 3), the operation icon image group Wi in which operation icon images are arranged in the vertical direction appears from the right end of the LCD 11, moves to the left, and stops such that a peripheral area along the right side of the display screen is the initial display position. In this case, the operation icon image group Wi moves upward or downward in a scrolling manner in accordance with the operation of moving the touch position on the touch panel 12 upward or downward. Then, the operation icon image group Wi is withdrawn from the display screen and erased in accordance with operation of moving the touch position on the touch panel 12 to the right. Further, if the operation of causing the display target to appear has been performed by the operation of moving the touch position on the touch panel 12 upward (a slide operation or a swipe operation in the direction C shown in FIG. 3), the operation icon image group Wi in which operation icon images are arranged in the horizontal direction appears from the lower end of the LCD 11, moves upward, and stops such that a peripheral area along the lower side of the display screen is the initial display position. In this case, the operation icon image group Wi moves to the left or right in a scrolling manner in accordance with the operation of moving the touch position on the touch panel 12 to the left or right. Then, the operation icon image group Wi is withdrawn from the display screen and erased in accordance with the operation of moving the touch position on the touch panel 12 downward. It should be noted that in the second and third examples described above, a touch operation may be performed on a part of the image that has been displayed before the appearance of the operation icon image group Wi, thereby erasing the operation icon image group Wi.

In addition, the operation icon image group Wi may appear if the direction of moving the touch position on the touch panel 12 corresponds to at least two directions determined in advance, so long as the operation is not used in the game play. As an example, the operation icon image group Wi may appear in accordance only with the operation of moving the touch position on the touch panel 12 in the horizontal direction (to the left or right), or only with the operation of moving the touch position on the touch panel 12 in the vertical direction (upward or downward). In the first case, even if the operation has been performed of moving the touch position on the touch panel 12 upward or downward, the operation icon image group Wi does not appear on the LCD 11. Then, if the operation of moving the touch position on the touch panel 12 to the left has been performed, the operation icon image group Wi appears at the right end of the LCD 11. If the operation has been performed of moving the touch position on the touch panel 12 to the right, the operation icon image group Wi appears at the left end of the LCD 11 (the state of FIG. 5). Further, in the second case, even if the operation has been performed of moving the touch position on the touch panel 12 to the left or right, the operation icon image group Wi does not appear on the LCD 11. Then, if the operation has been performed of moving the touch position on the touch panel 12 upward, the operation icon image group Wi appears at the lower end of the LCD 11. If the operation has been performed of moving the touch position on the touch panel 12 downward, the operation icon image group Wi appears at the upper end of the LCD 11 (the state of FIG. 6).

In addition, the operation direction of the operation of causing the operation icon image group Wi to appear and the moving direction of the appearance of the operation icon image group Wi may not be exactly the same. For example, if the moving direction of the appearance of the operation icon image group Wi is set to four directions at 90-degree intervals or the like, the direction closest to the operation direction may be selected from the set directions, and the operation icon image group Wi may be caused to move and appear.

As described above, in an example where the operation icon image group Wi appears on the LCD 11, the operation of moving the touch position on the touch panel 12 is performed, whereby it is possible to move the information image in a scrolling manner or withdraw and erase the operation icon image group Wi in accordance with the moving direction. Here, in an example where the operation icon image group Wi appears on the LCD 11, an operation in a direction opposite to the operation of causing the operation icon image group Wi to appear (that is, an operation performed such that the operation direction of the operation of moving the touch position on the touch panel 12 is the opposite direction) is performed, whereby it is possible to withdraw from the display screen the operation icon image group Wi having appeared and erase the operation icon image group Wi. Thus, the operation direction of the operation of displaying the display target on the display screen and the operation direction of the operation of erasing the display target from the display screen are opposite to each other. This enables the user to cause the display target to appear and erase the display target by intuitive operations. Further, the operation of moving the operation icon image group Wi having appeared in a scrolling manner is achieved by an operation in a direction different from that of the appearance operation and the withdrawal operation (the erasing operation). This makes it possible to perform display control including the erasing of the display target, only by performing the operation of moving the touch position on the touch panel 12, and also prevent the confusion between operations due to the fact that the withdrawal operation and the scrolling operation are the same operation. This can provide a very convenient operation.

Next, a detailed description is given of the display control process performed by the display control apparatus 3. It should be noted that the following description of the display control process uses the first example, where the information image appears as the display target on the LCD 11. First, with reference to FIG. 7, a description is given of main data used in the display control process. It should be noted that FIG. 7 is a diagram showing examples of main data and programs stored in the memory 6 of the display control apparatus 3.

Figure 7:
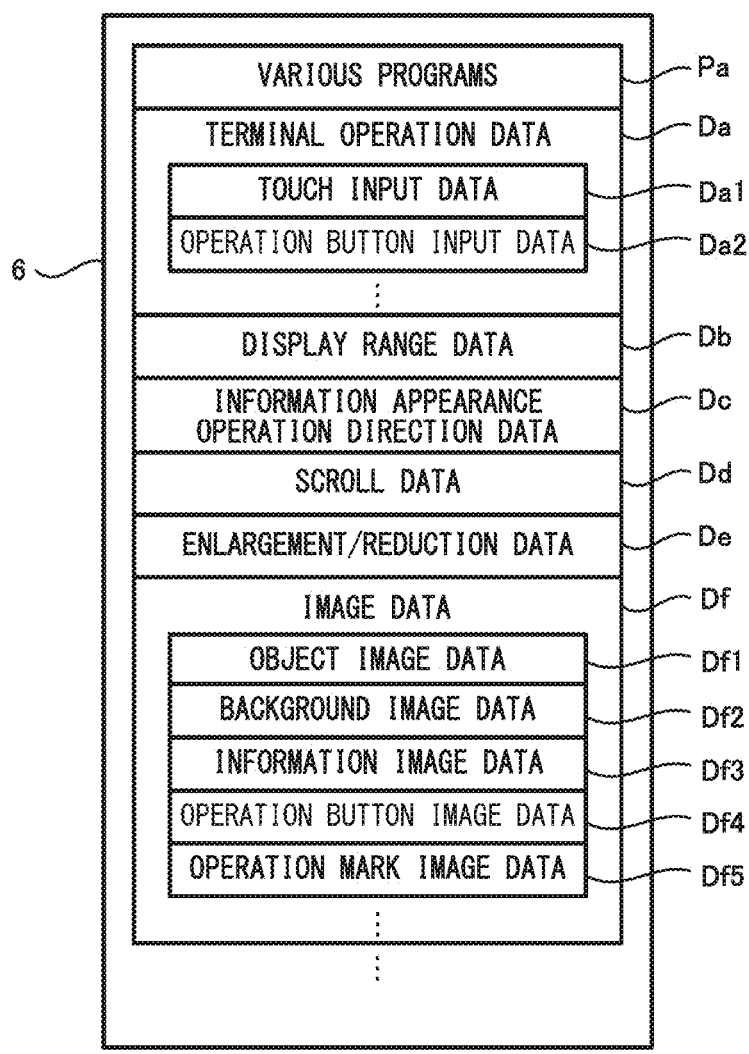
FIG. 7 is a diagram showing non-limiting examples of main data and programs stored in a memory 6 of a display control apparatus 3.

As shown in FIG. 7, the following are stored in the data storage area of the memory 6: terminal operation data Da; display range data Db; information appearance operation direction data Dc; scroll data Dd; enlargement/reduction data De; image data Df; and the like. It should be noted that the memory 6 may store, as well as the data shown in FIG. 7, data and the like necessary for the display control process and another process, such as data used in a game application to be executed. Further, in the program storage area of the memory 6, various programs Pa included in the display control program are stored.

The terminal operation data Da has stored therein a series of pieces of operation information (terminal operation data) transmitted as transmission data from the terminal apparatus 2, and is updated to the latest terminal operation data. For example, the terminal operation data Da includes touch input data Da1, operation button input data Da2, and the like. The touch input data Da1 is data representing the touch position of a touch operation on the touch panel 12, and stores at least data representing the latest touch position and data representing the touch position used in the previous processing. The operation button input data Da2 is data representing an operation on the operation section 13.

The display range data Db is data representing, among information images to be displayed on the terminal apparatus 2, a display range to be displayed on the LCD 11.

The information appearance operation direction data Dc is data representing the operation direction when the user has performed an information appearance operation.

The scroll data Dd is data representing, when the user has performed the operation of scrolling a displayed information image, the amount of scrolling and the scrolling direction of the scroll.

The enlargement/reduction data De is data representing, when the user has performed the operation of enlarging or reducing a displayed information image, the enlargement rate of the enlargement or the reduction rate of the reduction.

The image data Df includes object image data Df1, background image data Df2, information image data Df3, operation button image data Df4, operation mark image data Df5, and the like. The object image data Df1 is data for placing a game object in a virtual world to generate a game image. The background image data Df2 is data for placing a background in a virtual world to generate a game image. The information image data Df3 is data representing an information image that is caused to appear in accordance with a predetermined appearance operation. The operation button image data Df4 is data representing an operation button image B, which is displayed with an information image. The operation mark image data Df5 is data representing an operation mark image M, which is displayed with an information image.

Figure 8:
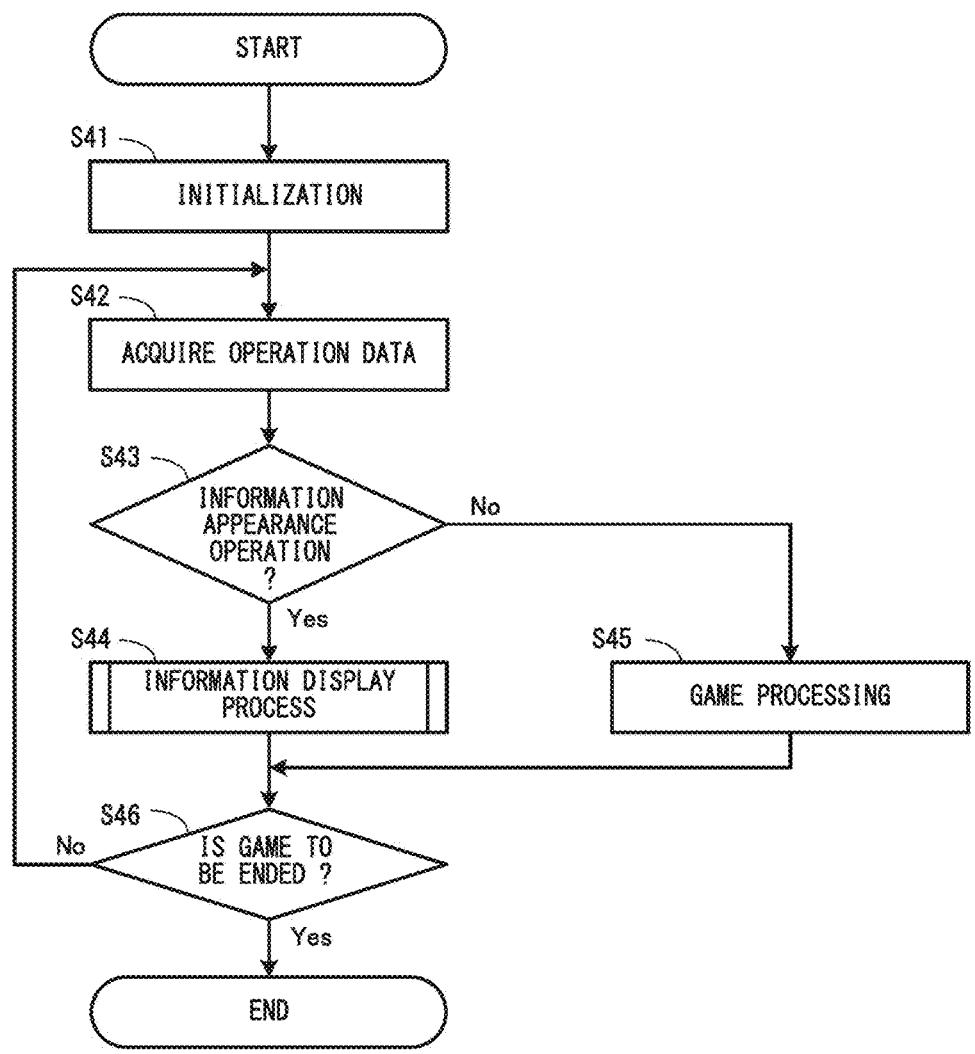
FIG. 8 is a flow chart showing a non-limiting example of a display control process performed by the display control apparatus 3.
Figure 9:
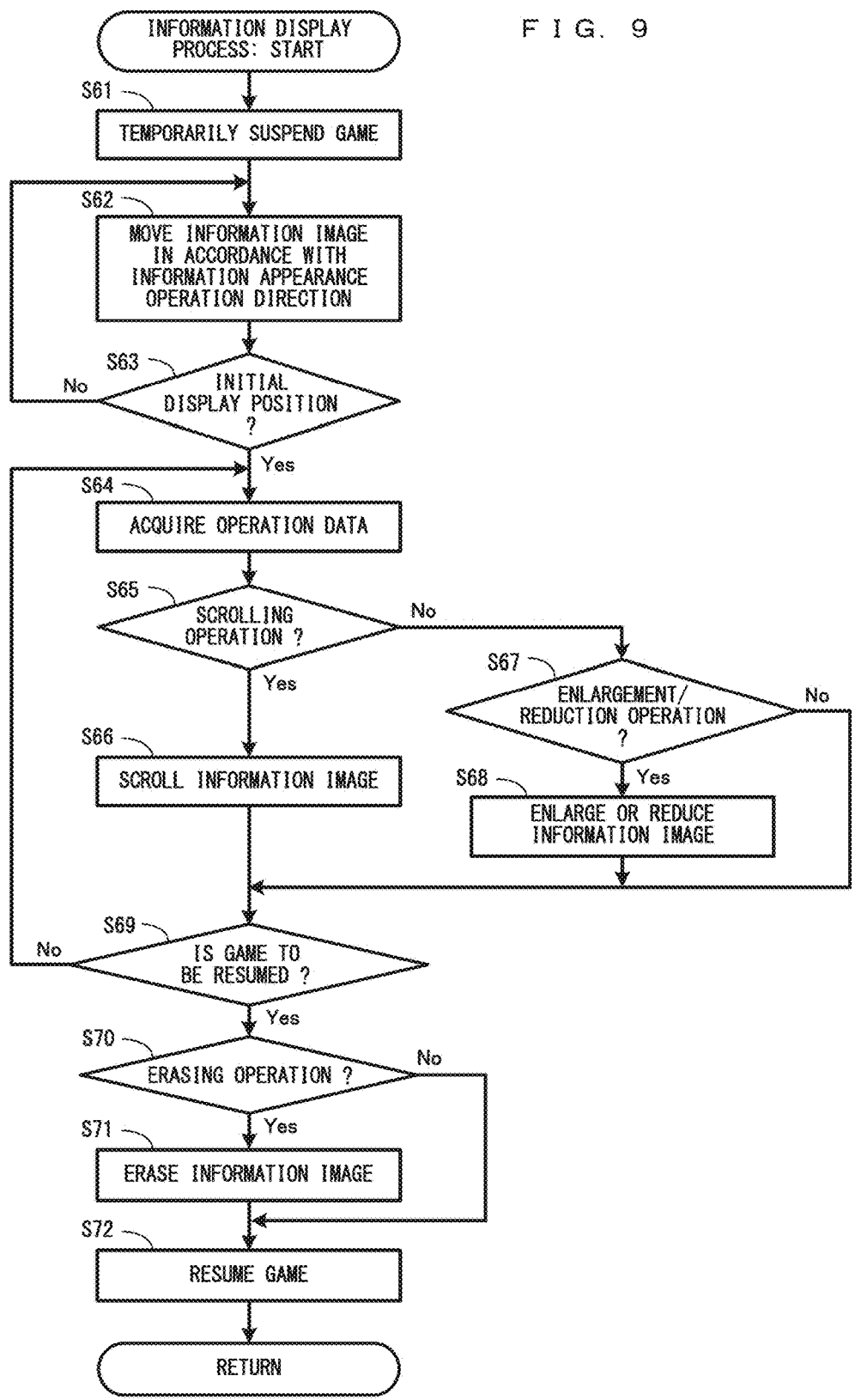
FIG. 9 is a subroutine showing a non-limiting example of an information display process in step 44 in FIG. 8.

Next, with reference to FIGS. 8 and 9, a detailed description is given of the display control process performed by the display control apparatus 3. It should be noted that FIG. 8 is a flow chart showing an example of the display control process performed by the display control apparatus 3. FIG. 9 is a subroutine flow chart showing an example of an information display process in step 44 in FIG. 8. Here, in the flow charts shown in FIGS. 8 and 9, a description is given mainly of, in the display control process performed by the display control apparatus 3, the process of displaying an information image on the terminal apparatus 2. Detailed descriptions of other processes not directly related to these processes are omitted.

The CPU 5 initializes the memory 6 and the like, and loads a display control process program stored in a non-volatile memory or an optical disk included in the display control apparatus 3 into the memory 6. Then, the CPU 5 starts the execution of the display control process program. The flow charts shown in FIGS. 8 and 9 are flow charts showing the processing performed after the above processes are completed.

It should be noted that the processes of all the steps in the flow charts shown in FIGS. 8 and 9 are merely illustrative. Thus, the processing order of the steps may be changed, or another process may be performed in addition to, and/or instead of, the processes of all the steps, so long as similar results are obtained. Further, in the present exemplary embodiment, a description is given on the assumption that the CPU 5 performs the processes of all the steps in the flow charts. Alternatively, a processor or a dedicated circuit other than the CPU may perform the processes of some or all of the steps in the flow charts.

In FIG. 8, the CPU 5 performs an initialization process (step 41), and the processing proceeds to the next step. For example, the CPU 5 places a game object used in a game to be played in the display control system 1, thereby constructing a virtual world to be displayed on the terminal apparatus 2 and the monitor 4. Then, the CPU 5 initializes the parameters used in game processing. Further, the CPU 5 initializes a display range in an information image to be displayed when an information appearance operation has been performed, and updates the display range data Db. Further, the CPU 5 initializes the amount of scrolling and the direction of the information image and the enlargement rate and the reduction rate of the information image and updates the scroll data Dd and the enlargement/reduction data De.

Next, the CPU 5 acquires operation data from the terminal apparatus 2 and updates the terminal operation data Da (step 42), and the processing proceeds to the next step. For example, the CPU 5 updates the latest data of the touch input data Da1 using data representing the touch position of a touch operation on the touch panel 12. Further, the CPU 5 updates the operation button input data Da2 using data output from the operation section 13.

Next, the CPU 5 determines whether or not the operation data acquired in the above step 42 indicates an information appearance operation (step 43). For example, if the operation data acquired in the above step 42 indicates the operation of moving the touch position on the touch panel 12 (a so-called slide operation, swipe operation, or the like; see FIG. 3), the CPU 5 determines that the operation data indicates the information appearance operation. Then, if the operation data indicates the information appearance operation, the CPU 5 selects the direction closest to the direction in which the information appearance operation has been performed (the direction in which the touch position on the touch panel 12 has moved) from appearance moving directions set in advance (for example, four directions at 90-degree intervals or the like or eight directions at 45-degree intervals or the like), and updates the information appearance operation direction data Dc. Then, the processing proceeds to step 44. If, on the other hand, the operation data does not indicate the information appearance operation, the processing proceeds to step 45. It should be noted that since the touch input data Da1 stores at least data representing the latest touch position and data representing the touch position used in the previous processing, the determination of the operation of moving the touch position on the touch panel 12 and the determination of the direction in which the information appearance operation has been performed may be made using data representing the history of the touch position.

In step 44, the CPU 5 performs an information display process, and the processing proceeds to step 46. With reference to FIG. 9, a description is given below of the information display process performed in the above step 44.

In FIG. 9, the CPU 5 performs the process of temporarily suspending the game that is being executed (step 61), and the processing proceeds to the next step. For example, the CPU 5 performs the process of suspending at the current moment the game processing that is being performed, and displaying on the LCD 11 and the monitor 4 the game image that has been displayed on the LCD 11 and the monitor 4 and is in a pause state, where the game image is stopped in the current state.

Next, in accordance with the information appearance operation direction stored in the information appearance operation direction data Dc, the CPU 5 displays the information image on the LCD 11 while moving the information image from outside the display screen to an initial display position (for example, the center of the display screen) (step 62), and the processing proceeds to the next step. For example, the CPU 5 moves the information image from outside the display screen of the LCD 11 in the information appearance operation direction so that if the information image has moved in the information appearance operation direction, the center of the display range in the information image coincides with the center of the display screen of the LCD 11.

Next, the CPU 5 determines whether or not the information image to be caused to appear has moved to the initial display position (step 63). Then, if the information image to be caused to appear has moved to the initial display position, the CPU 5 displays on the LCD 11 the information image displayed at the initial display position, the operation mark images Ma to Md, the operation button images Ba to Bc, and the like (see FIG. 4), and the processing proceeds to step 64. If, on the other hand, the information image to be caused to appear has not moved to the initial display position, the CPU 5 repeats the process of step 62.

In step 64, the CPU 5 acquires operation data from the terminal apparatus 2 and updates the terminal operation data Da, and the processing proceeds to the next step. It should be noted that the process of step 64 is similar to that of the above step 42 and therefore is not described in detail here.

Next, the CPU 5 determines whether or not the operation data acquired in the above step 64 indicates a scrolling operation (step 65). For example, if the operation data acquired in the above step 64 indicates the operation of moving the touch position on the touch panel 12 to the left or right, the CPU 5 determines that the operation data indicates the scrolling operation. If the operation data indicates the scrolling operation, the processing proceeds to step 66. If, on the other hand, the operation data does not indicate the scrolling operation, the processing proceeds to step 67. It should be noted that the determination of the operation of moving the touch position on the touch panel 12 may be made using data representing the history of the touch position stored in the touch input data Da1.

In step 66, the CPU 5 displays the information image on the LCD 11 while moving the information image in a scrolling manner in accordance with the operation data acquired in the above step 64, and the processing proceeds to step 69. For example, if the operation data acquired in the above step 64 indicates the operation of moving the touch position on the touch panel 12 to the left, the CPU 5 sets the scrolling speed based on the moving distance of the touch position, the touch position of a touch operation on the display screen, and the like and scrolls the information image to the left at the scrolling speed. At this time, the CPU 5 updates the display range in the information image in accordance with the scrolling operation. The CPU 5, however, moves the display range to the right of the information image at the set scrolling speed (a direction opposite to the direction of the scroll movement) and updates the display range data Db.

Meanwhile, in step 67, the CPU 5 determines whether or not the operation data acquired in the above step 64 indicates an enlargement/reduction operation. For example, if the operation data acquired in the above step 64 indicates the operation of moving the touch position on the touch panel 12 upward or downward, or the operation of touching a position on the operation button image Bc shown in FIG. 4, the CPU 5 determines that the operation data indicates the enlargement/reduction operation. If the operation data indicates the enlargement/reduction operation, the processing proceeds to step 68. If, on the other hand, the operation data does not indicate the enlargement/reduction operation, the processing proceeds to step 69. It should be noted that the determination of the operation of moving the touch position on the touch panel 12 may be made using data representing the history of the touch position stored in the touch input data Da1.

In step 68, the CPU 5 displays the information image on the LCD 11 by enlarging or reducing the information image in accordance with the operation data acquired in the above step 64, and the processing proceeds to step 69. For example, if the operation data acquired in the above step 64 indicates the operation of moving the touch position on the touch panel 12 upward, the CPU 5 sets the enlargement rate based on the moving distance of the touch position, the touch position of a touch operation on the display screen, and the like and displays the information image in an enlarged manner at the enlargement rate. If the operation data acquired in the above step 64 indicates the operation of touching a position on the operation button image Bc, the CPU 5 reduces the information image so that the entire page (the entire display area) of the information image is displayed on the LCD 11. Then, the CPU 5 displays the information image representing a list. At this time, the CPU 5 calculates the display range in the information image in accordance with the enlargement/reduction operation and updates the display range data Db.

In step 69, the CPU 5 determines whether or not the operation data acquired in the above step 64 indicates the operation of resuming the game. For example, if the operation data acquired in the above step 64 indicates the operation of touching a position on the operation button image Ba or the operation button image Bb shown in FIG. 4, the CPU 5 determines that the operation data indicates a game resumption operation. Then, if the operation data indicates the game resumption operation, the processing proceeds to step 70. If, on the other hand, the operation data does not indicate the game resumption operation, the CPU 5 returns to the above step 64 and continues the process thereof.

In step 70, the CPU 5 determines whether or not the operation data acquired in the above step 64 indicates the operation of erasing the information image. For example, if the operation data acquired in the above step 64 indicates the operation of touching a position on the operation button image Ba shown in FIG. 4, the CPU 5 determines that the operation data indicates an information image erasing operation. Then, if the operation data indicates the information image erasing operation, the processing proceeds to step 71. If, on the other hand, the operation data does not indicate the information image erasing operation, the processing proceeds to step 72.

In step 71, the CPU 5 erases the information image from the LCD 11, and the processing proceeds to step 72.

In step 72, the CPU 5 performs the process of resuming the game that has been suspended in the process of step 61, and the processing of the subroutine ends.

Referring back to FIG. 8, if it has been determined in the above step 43 that the operation data does not indicate the information appearance operation, the CPU 5 performs game processing corresponding to the operation data acquired in the above step 42 (step 45), and the processing proceeds to step 46. It should be noted that the game processing to be performed in the above step 45 is not described in detail.

In step 46, the CPU 5 determines whether or not the game is to be ended. In the above step 46, examples of conditions for ending the game include: the fact that the game is over; and the fact that the user has performed the operation of ending the game. If the game is not to be ended, the CPU 5 returns to the above step 42 and repeats the process thereof. If the game is to be ended, the CPU 5 ends the processing indicated in the flow charts. Thereafter, the CPU 5 repeatedly performs a series of processes of steps 42 to 46 until it is determined in step 46 that the game is to be ended.

It should be noted that if the game has been resumed with the information image displayed on the LCD 11, then in the process of step 43, the CPU 5 may determine whether or not any one of the scrolling operation, the enlargement/reduction operation, and the erasing operation has been performed, instead of the information appearance operation. Then, if the scrolling operation or the enlargement/reduction operation has been performed, the CPU 5 may temporarily suspend the game and move the information image corresponding to the operation in a scrolling manner or display the information image corresponding to the operation in an enlarged or reduced manner. Then, in accordance with the fact that the operation of resuming the game has been performed, the CPU 5 may continue the process of the above step 42. Further, if the erasing operation has been performed, the CPU 5 may erase the information image from the LCD 11 without suspending the game and continue the process of the above step 42.

In addition, in the above description, in accordance with a touch operation on the touch panel 12, a display target such as an information image or an operation icon image group is caused to appear on the display screen, and display control after the appearance of the display target is performed. Alternatively, these display control processes may be performed in accordance with the position indicated using another pointing device for specifying a position on the screen. Here, the pointing device is an input apparatus for specifying an input position or coordinates on the screen and is achieved by a system where, as well as the touch panel 12, a mouse, a trackpad, or a trackball is used to specify a position on the screen, or a game controller is pointed to a position on the screen, thereby detecting a particular position on the screen.

In addition, the terminal apparatus 2 described above functions as a so-called thin client terminal, which does not perform the series of processes described with reference to FIGS. 8 and 9 or the display control process performed by the display control apparatus 3. For example, if the display control process is performed by a plurality of display control apparatuses, it is necessary to synchronize the processes performed by the display control apparatuses, which complicates the display control process. In contrast, as in the above exemplary embodiment, if the display control process is performed by a single display control apparatus 3, and the terminal apparatus 2 receives and displays an image (that is, if the terminal apparatus 2 is a thin client terminal), it is not necessary to synchronize the processes among a plurality of display control apparatuses, which can simplify the display control process. The terminal apparatus 2, however, may be an apparatus having the function of performing a predetermined display control process by a predetermined program (a display control program), such as a handheld game apparatus. In this case, in the above exemplary embodiment, at least some of the series of processes to be performed by the display control apparatus 3 may be performed by the terminal apparatus 2.

In addition, the above description has been given using an example where an image generated by the display control apparatus 3 is displayed on each of the monitor 4 and the LCD 11 of the terminal apparatus 2. The image, however, may be displayed on each of a plurality of display screens provided in a single apparatus. In either case, it is possible to, with a game image displayed on one display screen (for example, the display screen of the monitor 4), display a display target such as an information image or an operation icon image group on the other display screen (for example, the display screen of the LCD 11). If, however, such effects are not desired, an image may be displayed only on a single display screen (for example, the display screen of the LCD 11). In this case, the exemplary embodiment can be achieved by the form of a system where the display control apparatus 3 and the terminal apparatus 2 are connected together, or the form of a system where the terminal apparatus 2 is provided solely. If the exemplary embodiment is achieved by the form of a system where the terminal apparatus 2 is provided solely, not only a handheld game apparatus but also an information processing apparatus in any form, such as a personal computer, a mobile terminal, a smartphone, or a tablet, may be used.

In the above examples, a display target such as the information image or the operation icon image group Wi appears during the game play. Alternatively, another display target may be caused to appear. For example, on a display screen of a mobile terminal, a smartphone, a tablet, or the like, a map, a menu screen for reproducing music, a screen for setting a network connection, or the like may be caused to appear as a display target. Yet alternatively, in accordance with the operation of causing a display target to appear, a shortcut function for starting a predetermined application may be enabled, and the application screen may be caused to appear and displayed as a display target.

It should be noted that the above descriptions are given using the example where the display control apparatus 3 performs a display control process. Alternatively, an apparatus other than the terminal apparatus 2 may perform at least some of the processes of steps in the above processing. For example, if the display control apparatus 3 is further configured to communicate with an apparatus other than the terminal apparatus 2 (for example, another server, another game apparatus, or another mobile terminal), the other apparatus may cooperate to perform the processes of steps in the above processing. Another apparatus may thus perform at least some of the processes of steps in the above processing, which enables processing similar to that described above. Further, the above processing can be performed by a processor or the cooperation of a plurality of processors, the processor or the plurality of processors contained in a display control system including at least one display control apparatus. Further, in the exemplary embodiment, the processing indicated in the above flow charts is performed by the CPU 5 of the display control apparatus 3 executing a predetermined program. Alternatively, a part or all of the above processing may be performed by a dedicated circuit included in the display control apparatus 3.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary display control apparatus (a stationary game apparatus) and a handheld display control apparatus (a handheld game apparatus) by the cooperation of the apparatuses. It should be noted that, in these system forms, there is no particular limitation on which apparatus performs the process of each step in the above processing. Thus, it goes without saying that it is possible to achieve the exemplary embodiment by sharing the processing in any manner.

In addition, the processing orders, the setting values, the conditions used in the determinations, and the like that are used in the game processing described above are merely illustrative. Thus, it goes without saying that the exemplary embodiment can be achieved also with other orders, other values, and other conditions.

In addition, the above programs may be supplied to the display control apparatus 3 not only through an external storage medium such as the external memory, but also through a wired or wireless communication link. Further, the program may be stored in advance in a non-volatile storage device included in the display control apparatus 3. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a display control program, a display control apparatus, a display control system, a display control method, and the like in order, for example, to improve the convenience of an operation.

What is claimed is:

1. A non-transitory computer-readable storage medium having stored therein a display control program comprising instructions to be executed by a computer included in an apparatus for, in accordance with an operation using a pointing device for inputting an input position on a display screen, displaying an image on the display screen, the display control program causing the computer to execute:
    acquiring an input using the pointing device;
    determining whether or not the input using the pointing device is an operation of moving the input position;
    if it has been determined that the input using the pointing device is the operation of moving the input position, determining an operation direction of the operation of moving the input position; and
    if the determined operation direction corresponds to any one of a plurality of directions determined in advance, moving a predetermined display target in a direction based on the operation direction, thereby causing the predetermined display target to appear on the display screen, wherein
    in the process of causing the display target to appear, if it has been determined that the operation direction corresponds to any one of the plurality of directions, a common display target is caused to appear without simultaneously displaying the common display target from the plurality of directions, regardless of which one of the plurality of directions the operation direction corresponds to,
    if an operation in the operation direction corresponding to any one of the plurality of directions has been performed again with the display target displayed while completely appearing on the display screen, displaying the display target on the display screen while further moving the display target in a scrolling manner in accordance with the operation direction, and
    the display target is moved in the scrolling manner in accordance with the operation direction as the display target substantially covers the display screen.

2. The non-transitory computer-readable storage medium having stored therein the display control program according to claim 1, the display control program further causing the computer to execute, if a predetermined operation different from an operation capable of causing the display target to appear has been performed with the display target displayed on the display screen, erasing the display target from the display screen.

3. The non-transitory computer-readable storage medium having stored therein the display control program according to claim 2, wherein
    the predetermined operation is an operation of selecting, using the pointing device, a predetermined display area displayed on the display screen.

4. The non-transitory computer-readable storage medium having stored therein the display control program according to claim 1, wherein
    in the process of causing the display target to appear,
    if the operation direction of the operation of causing the display target to appear has been upward or downward on the display screen, a display target capable of moving to the left or right on the display screen in accordance with an operation using the pointing device is caused to appear, and
    if the operation direction of the operation of causing the display target to appear has been to the left or right on the display screen, a display target capable of moving upward or downward on the display screen in accordance with an operation using the pointing device is caused to appear.

5. The non-transitory computer-readable storage medium having stored therein the display control program according to claim 1, the display control program further causing the computer to execute, if the operation direction of the operation of causing the display target to appear has been upward or downward on the display screen and after the display target has been displayed on the display screen, erasing the display target from the display screen in accordance with an operation of which an operation direction is upward or downward on the display screen, and if the operation direction of the operation of causing the display target to appear has been to the left or right on the display screen and after the display target has been displayed on the display screen, erasing the display target from the display screen in accordance with an operation of which an operation direction is to the left or right on the display screen.

6. The non-transitory computer-readable storage medium having stored therein the display control program according to claim 1, wherein
    the plurality of directions determined in advance are two or more of up, down, left, and right directions on the display screen.

7. The non-transitory computer-readable storage medium having stored therein the display control program according to claim 1, wherein
    in the process of causing the display target to appear, the display target is displayed on top of at least part of a display image that has been displayed on the display screen before the display target has been caused to appear.

8. The non-transitory computer-readable storage medium having stored therein the display control program according to claim 7, wherein
    in the process of causing the display target to appear, the display target is displayed on top of an entirety of a display image that has been displayed on the display screen before the display target has been caused to appear.

9. The non-transitory computer-readable storage medium having stored therein the display control program according to claim 1, wherein the display target is an information image that describes information regarding a display image that has been displayed on the display screen before the display target has been caused to appear, or that describes information regarding the apparatus.

10. The non-transitory computer-readable storage medium having stored therein the display control program according to claim 1, wherein the display control program further causing the computer to execute displaying on each of a plurality of display screens a display image based on execution of a predetermined application, wherein in the process of causing the display target to appear, a display target different from the display image is caused to appear on one of the plurality of display screens.

11. The non-transitory computer-readable storage medium having stored therein the display control program according to claim 1, wherein the display target is capable of being displayed on the display screen as a single target.

12. The non-transitory computer-readable storage medium having stored therein the display control program according to claim 1, wherein the display control program further causing the computer to execute displaying on the display screen an application image corresponding to execution of a predetermined application, wherein in the process of causing the display target to appear, a state is switched to a pause state where the application image is temporarily stopped, and the display target is caused to appear.

13. The non-transitory computer-readable storage medium having stored therein the display control program according to claim 1, wherein a first game image is displayed on the display screen, and the first game image is further displayed on an additional display screen, and a common display target is displayed over the first image displayed on the display screen while being omitted from display on the additional display screen.

14. The non-transitory computer-readable storage medium having stored therein the display control program according to claim 1, wherein the display control program corresponds to a video game.

15. The non-transitory computer-readable storage medium having stored therein the display control program according to claim 14, wherein the operation is one that is not normally used during game play of the video game.

16. The non-transitory computer-readable storage medium having stored therein the display control program according to claim 1, wherein the display target emerges from an end of the display screen that is opposite to the operation direction.

17. The non-transitory computer-readable storage medium having stored therein the display control program according to claim 1, wherein if an operation in the operation direction corresponding to any one of the plurality of directions has been performed again with the display target displayed while completely appearing on the display screen, displaying the display target on the display screen while further enlarging or reducing the display target in accordance with the operation direction.

18. A display control apparatus for, in accordance with an operation using a pointing device for inputting an input position on a display screen, displaying an image on the display screen, the display control apparatus comprising:

one or more processors configured to:
acquire an input using the pointing device;
determine whether or not the input using the pointing device is an operation of moving the input position;
if it has been determined that the input using the pointing device is the operation of moving the input position, determine an operation direction of the operation of moving the input position;
if the determined operation direction corresponds to any one of a plurality of directions determined in advance, move a predetermined display target in a direction based on the operation direction, thereby causing the predetermined display target to appear on the display screen, wherein in the process of causing the display target to appear, if it has been determined that the operation direction corresponds to any one of the plurality of directions, a common display target is caused to appear without simultaneously displaying the common display target from the plurality of directions, regardless of which one of the plurality of directions the operation direction corresponds to, if an operation in the operation direction corresponding to any one of the plurality of directions has been performed again with the display target displayed while completely appearing on the display screen, displaying the display target on the display screen while further moving the display target in a scrolling manner in accordance with the operation direction, and the display target is moved in the scrolling manner in accordance with the operation direction as the display target substantially covers the display screen.

19. A display control system, including a plurality of apparatuses capable of communicating with each other, for, in accordance with an operation using a pointing device for inputting an input position on a display screen, displaying an image on the display screen, the display control system comprising:

a processing system having one or more processors, the processing system configured to:
acquire an input using the pointing device;
determine whether or not the input using the pointing device is an operation of moving the input position;
if it has been determined that the input using the pointing device is the operation of moving the input position, determine an operation direction of the operation of moving the input position;
if the determined operation direction corresponds to any one of a plurality of directions determined in advance, move a predetermined display target in a direction based on the operation direction, thereby causing the predetermined display target to appear on the display screen, wherein in the process of causing the display target to appear, if it has been determined that the operation direction corresponds to any one of the plurality of directions, a common display target is caused to appear without simultaneously displaying the common display target from the plurality of directions, regardless of which one of the plurality of directions the operation direction corresponds to, if an operation in the operation direction corresponding to any one of the plurality of directions has been performed again with the display target displayed while completely appearing on the display screen, displaying the display target on the display screen while further moving the display target in a scrolling manner in accordance with the operation direction, and the display target is moved in the scrolling manner in accordance with the operation direction as the display target substantially covers the display screen.

20. A display control method to be executed by a processor or a cooperation of a plurality of processors, the processor or the plurality of processors contained in a system including at least one apparatus for, in accordance with an operation using a pointing device for inputting an input position on a display screen, displaying an image on the display screen, the display control method comprising:

acquiring an input using the pointing device;

determining whether or not the input using the pointing device is an operation of moving the input position;

if it has been determined that the input using the pointing device is the operation of moving the input position, determining an operation direction of the operation of moving the input position; and if the determined operation direction corresponds to any one of a plurality of directions determined in advance, moving a predetermined display target in a direction based on the operation direction, thereby causing the predetermined display target to appear on the display screen, wherein in the process of causing the display target to appear, if it has been determined that the operation direction corresponds to any one of the plurality of directions, a common display target is caused to appear without simultaneously displaying the common display target from the plurality of directions, regardless of which one of the plurality of directions the operation direction corresponds to, if an operation in the operation direction corresponding to any one of the plurality of directions has been performed again with the display target displayed while completely appearing on the display screen, displaying the display target on the display screen while further moving the display target in a scrolling manner in accordance with the operation direction, and the display target is moved in the scrolling manner in accordance with the operation direction as the display target substantially covers the display screen.

21. A non-transitory computer-readable storage medium having stored therein a display control program comprising instructions to be executed by a computer included in an apparatus for, in accordance with an operation using a pointing device for inputting an input position on a display screen, displaying an image on the display screen, the display control program causing the computer to execute:

acquiring an input using the pointing device;

determining an operation direction of an operation of moving the input position using the pointing device; and if the determined operation direction corresponds to at least either a first direction or a second direction determined in advance, moving a predetermined display target in a direction corresponding to the operation direction, thereby causing the predetermined display target to appear on the display screen, wherein in the process of causing the display target to appear, a common display target is caused to appear, without simultaneously displaying the common display target from a plurality of directions, when the operation direction has been determined as corresponding to the first direction or when the operation direction has been determined as corresponding to the second direction, if an operation in the operation direction corresponding to the first direction or the second direction has been performed again with the display target displayed while completely appearing on the display screen, displaying the display target on the display screen while further moving the display target in a scrolling manner in accordance with the operation direction, and the display target is moved in the scrolling manner in accordance with the operation direction as the display target substantially covers the display screen.

* * * * *